US010777367B2

(12) United States Patent
Kim et al.

(10) Patent No.: US 10,777,367 B2
(45) Date of Patent: Sep. 15, 2020

(54) FIBROUS ELECTRODE WITH BUCKLE STRUCTURE, METHOD OF MANUFACTURING THE SAME, AND SUPERCAPACITOR INCLUDING THE SAME

(71) Applicant: IUCF-HYU (INDUSTRY-UNIVERSITY COOPERATION FOUNDATION HANYANG UNIVERSITY), Seoul (KR)

(72) Inventors: Seon Jeong Kim, Seoul (KR); Chang Soon Choi, Seoul (KR); Kang Min Kim, Seoul (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 0 days.

(21) Appl. No.: 16/117,659

(22) Filed: Aug. 30, 2018

(65) Prior Publication Data

US 2019/0006125 A1    Jan. 3, 2019

Related U.S. Application Data

(63) Continuation of application No. PCT/KR2016/005065, filed on May 13, 2016.

(30) Foreign Application Priority Data

Mar. 3, 2016   (KR) .................. 10-2016-0025921

(51) Int. Cl.
*B82Y 30/00*   (2011.01)
*B82Y 40/00*   (2011.01)
(Continued)

(52) U.S. Cl.
CPC ............. *H01G 11/36* (2013.01); *H01G 11/26* (2013.01); *H01G 11/40* (2013.01); *H01G 11/46* (2013.01);
(Continued)

(58) Field of Classification Search
CPC ........ H01G 11/36; H01G 11/48; H01G 11/26; H01G 11/46; H01G 11/86; H01G 11/40;
(Continued)

(56) References Cited

U.S. PATENT DOCUMENTS 7,641,885 B2 *   1/2010   Liu ................. B82Y 30/00
                                                  423/447.3
9,251,968 B2 *   2/2016   Kim ................. H01G 11/48
(Continued)

FOREIGN PATENT DOCUMENTS

KR   10-2011-0125808 A   11/2011
KR   10-2012-0096451 A   8/2012
(Continued)

OTHER PUBLICATIONS

Z. F. Liu et al., "Hierarchically buckled sheath-core fibers for superelastic electronics, sensors, and muscles", Science, pp. 400-404, Jul. 24, 2015, vol. 349, Issue 6246.
(Continued)

*Primary Examiner* — Nathan Milakovich
(74) *Attorney, Agent, or Firm* — Sughrue Mion, PLLC (57)   ABSTRACT

A fibrous electrode includes a carbon nanotube sheet which is coated on an elastic fiber and has a buckle structure. Thus, the fibrous electrode may maintain a fiber shape, may be light and small and may maintain excellent conductivity even when variously deformed. In addition, the fibrous electrode has high elasticity and thus is capable of being variously deformed (e.g., bent or stretched) and of being realized in the form of textile. As a result, the fibrous (Continued)

electrode may be effectively applied to flexible electronic devices such as implantable medical devices, microelectronic devices, Google glasses, smart watches, wearable computers, and smart clothing. Furthermore, a supercapacitor using the fibrous electrode includes flexible materials and thus is not easily damaged by external force such as tension or pressure. As a result, the supercapacitor may be applied to various fields because of its excellent flexibility.

8 Claims, 5 Drawing Sheets (51) Int. Cl.
| | |
|---|---|
| H01G 11/26 | (2013.01) |
| H01G 11/34 | (2013.01) |
| H01G 11/36 | (2013.01) |
| H01G 11/40 | (2013.01) |
| H01G 11/46 | (2013.01) |
| H01G 11/48 | (2013.01) |
| H01G 11/86 | (2013.01) |

(52) U.S. Cl.
CPC ............ *H01G 11/48* (2013.01); *H01G 11/86* (2013.01); *B82Y 30/00* (2013.01); *B82Y 40/00* (2013.01); *H01G 11/34* (2013.01); *Y02E 60/13* (2013.01); *Y10S 977/742* (2013.01)

(58) Field of Classification Search
CPC ..... H01G 11/34; Y02E 60/13; Y10S 977/742; B82Y 40/00; B82Y 30/00
See application file for complete search history.

(56) References Cited

U.S. PATENT DOCUMENTS

| | | | | |
|---|---|---|---|---|
| 9,453,118 | B2* | 9/2016 | Kim | .......................... D01D 1/02 |
| 10,176,934 | B2* | 1/2019 | Kim | ....................... H01G 11/36 |
| 10,446,330 | B2* | 10/2019 | Kim | ....................... H01G 11/26 |
| 2008/0170982 | A1* | 7/2008 | Zhang | ................... B82Y 10/00 423/447.3 |
| 2018/0194102 | A1* | 7/2018 | Lima | ........................... C09J 7/38 |
| 2018/0374659 | A1* | 12/2018 | Kim | ....................... H01G 11/36 |
| 2019/0067497 | A1* | 2/2019 | Thomas | ............... H01G 9/2068 |

FOREIGN PATENT DOCUMENTS

| | | |
|---|---|---|
| KR | 10-1219579 B1 | 1/2013 |
| KR | 10-2014-0142415 A | 12/2014 |
| KR | 10-1502080 B1 | 3/2015 |

OTHER PUBLICATIONS

Tao Chen et al. "High-Performance, Stretchable, Wire-Shaped Supercapacitors", Angewandte Communications. Chem. Int. Ed., Jan. 7, 2015, pp. 618-622, vol. 54, Issue 2.
Keyu Xie et al., "Materials and Structures for Stretchable Energy Storage and Conversion Devices", Adv. Mater., Jun. 11, 2014, pp. 3592-3617, vol. 26, Issue 22.
Zhibin Yang et al., "A Highly Stretchable, Fiber-Shaped Supercapacitor", Angew. Chem. Int. Ed., Dec. 9, 2013, pp. 13453-13457, vol. 52, Issue 50.
Changsoon Choi, "Elastomeric and dynamic MnO2/CNT core-shell structure coiled yarn supercapacitor", Advanced Energy Materials, Jan. 11, 2016, pp. 1-25, vol. 6, Issue 5.
Changsoon Choi et al., "Stretchable, Weavable Coiled Carbon Nanotube/MnO$_2$/Polymer Fiber Solid-State Supercapacitors", Scientific Reports, Mar. 23, 2015, pp. 1-6, vol. 5, No. 9387.
Cunjiang Yu et al., "Stretchable Supercapacitors Based on Buckled Single-Walled Carbon Nanotube Macrofilms", Adv. Mater., 2009, pp. 4793-4797, vol. 21.
Han Gi Chae et al., "Carbon nanotube reinforced small diameter polyacrylonitrile based carbon fiber", Composites Science and Technology, 2009, pp. 406-413, vol. 69.
International Search Report of PCT/KR2016/005065 dated Dec. 2, 2016 [PCT/ISA/210].

\* cited by examiner

FIBROUS ELECTRODE WITH BUCKLE STRUCTURE, METHOD OF MANUFACTURING THE SAME, AND SUPERCAPACITOR INCLUDING THE SAME

CROSS-REFERENCE TO RELATED APPLICATION

This application is a continuation of pending International Application No. PCT/KR2016/005065, which was filed on May 13, 2016 and claims priority to Korean Patent Application No. 10-2016-0025921, filed on Mar. 3, 2016, in the Korean Intellectual Property Office, the disclosures of which are hereby incorporated by reference in their entireties.

BACKGROUND

1. Field

The present disclosure herein relates to a fibrous electrode, and more particularly, to a fibrous electrode which has a buckle structure and maintains excellent electrical conductivity in various deformations (e.g., bending or stretching), a method of manufacturing the same, and a supercapacitor including the same.

2. Description of the Related Art

Generally, capacitors may store electrical energy. A supercapacitor may have a specific capacitance which is several thousand times greater than that of a conventional capacitor. The supercapacitor is spotlighted as a next-generation energy storage medium because of its high power density, high charging/discharging rates, environmental friendliness, long life span, and low cost per charge/discharge cycle.

Recently, electronic devices have been advanced to be used in various fields such as flexible displays, smart surgical instruments, smart clothing, dielectric elastomer actuators, Google glasses, smart watches, wearable computers, implantable medical devices, and microelectronic devices, and thus flexible electronic devices have been actively developed.

Therefore, to smoothly develop and use electronic devices, capacitors used as energy sources of the electronic devices should be flexible according to deformation of the electronic devices.

However, since the supercapacitor is generally formed by inserting a liquid electrolyte between a rigid metal layer and an electrode (e.g., carbon) on the rigid metal layer, flexibility of the supercapacitor may be significantly low. Thus, it is difficult to apply the supercapacitor to the electronic devices described above.

To solve the above limitation, a thread-shaped capacitor having flexibility have been developed. This relates to a supercapacitor which includes an electrolyte, and a positive electrode and a negative electrode formed by seed-growing a nanowire on a surface of a nanofiber. This supercapacitor has flexibility, durability, and a high specific capacitance, but performance of the supercapacitor may be deteriorated by various deformations (e.g., stretching in a longitudinal direction, bending, and twisting). Thus, application range of the supercapacitor is limited (patent document 1).

Thus, it is required to develop a fibrous electrode having a new structure, which is capable of solving the above limitations and of maintaining excellent battery performance in various deformations such as bending or stretching.

Patent Document 1: Korean Patent Publication No. 10-2011-0107196

SUMMARY

The present disclosure may provide a fibrous electrode with a buckle structure, which has excellent variability or flexibility and is capable of maintaining its performance in various deformations, a method of manufacturing the same, and a supercapacitor including the same.

In an aspect, a fibrous electrode includes an elastic fiber, and a carbon nanotube sheet that is coated on a surface of the elastic fiber and has at least one layer. The carbon nanotube sheet has a buckle structure.

In an embodiment, the carbon nanotube sheet may be wound in such a way that an alignment direction of the carbon nanotube sheet is parallel to a longitudinal direction of the elastic fiber, so as to be coated on the surface of the elastic fiber.

In an embodiment, the buckle structure may have a wave shape having a pattern distance of 1 μm to 5 μm and a pattern width of 1 μm to 5 μm.

In an embodiment, the fibrous electrode may further include an electrode active material on a surface of the carbon nanotube sheet.

In an embodiment, the electrode active material may be an oxide (MeOx) including one metal (Me) selected from a group consisting of Si, Sn, Li, Al, Ag, Bi, In, Ge, Pb, Pt, Ti, Zn, Mg, Mn, Cd, Ce, Cu, Co, Ni, and Fe or may be one conductive polymer selected from a group consisting of poly(3,4-ethylenedioxythiophene), polyaniline, and polypyrrole.

In an embodiment, an elastic strain of the fibrous electrode may range from 100% to 500%.

In another aspect, a method of manufacturing a fibrous electrode includes forming a carbon nanotube sheet, stretching an elastic fiber by 100% to 700% in its longitudinal direction and fixing both ends of the elastic fiber, winding the carbon nanotube sheet in such a way that an alignment direction of the carbon nanotube sheet is parallel to the longitudinal direction of the elastic fiber of which the both ends are fixed, thereby forming the elastic fiber coated with the carbon nanotube sheet, and releasing the fixed both ends of the elastic fiber coated with the carbon nanotube sheet to allow the carbon nanotube sheet to have a buckle structure.

In an embodiment, the winding of the carbon nanotube sheet may include controlling the number of layers of the carbon nanotube sheet coated on the elastic fiber in such a way that a resistance of the elastic fiber coated with the carbon nanotube sheet ranges from 0.5 kΩ/cm to 2 kΩ/cm.

In an embodiment, the method may further include applying physical compression to the elastic fiber coated with the carbon nanotube sheet after the winding of the carbon nanotube sheet.

In an embodiment, the buckle structure may have a wave shape having a pattern distance of 1 μm to 5 μm and a pattern width of 1 μm to 5 μm.

In an embodiment, the method may further include electrochemically depositing an electrode active material on a surface of the fibrous electrode.

In still another aspect, a supercapacitor includes at least one fibrous electrode described above.

DETAILED DESCRIPTION OF THE EMBODIMENTS

Hereinafter, various aspects and various embodiments of the inventive concepts will be described in more detail.

A typical supercapacitor is hard and heavy and has no mechanical freedom (i.e., no variability or flexibility), and thus application field thereof is limited.

To solve these limitations, a supercapacitor using a fibrous electrode has been developed to improve mechanical freedom. However, the supercapacitor has low flexibility and thus is difficult to be applied to a flexible electronic device. In addition, performances (e.g., electrical conductivity) of the supercapacitor are deteriorated when it is deformed. Due to these limitations, it is difficult to realize a supercapacitor having desired performances.

However, a fibrous electrode according to an embodiment of the inventive concepts may be formed by coating a surface of an elastic fiber with a carbon nanotube sheet to have a buckle structure. Thus, even though the fibrous electrode is variously deformed (e.g., stretched in a longitudinal direction or bent), the carbon nanotube sheet may be deformed in the same direction as the fibrous electrode to uniformly maintain electrical conductivity without breaking electrical connection.

An aspect of the inventive concepts relates to a fibrous electrode which includes an elastic fiber, and a carbon nanotube sheet having at least one layer and coated on a surface of the elastic fiber. Here, the carbon nanotube sheet has a buckle structure. A structure of the fibrous electrode is shown in FIG. 1.

Figure 1:
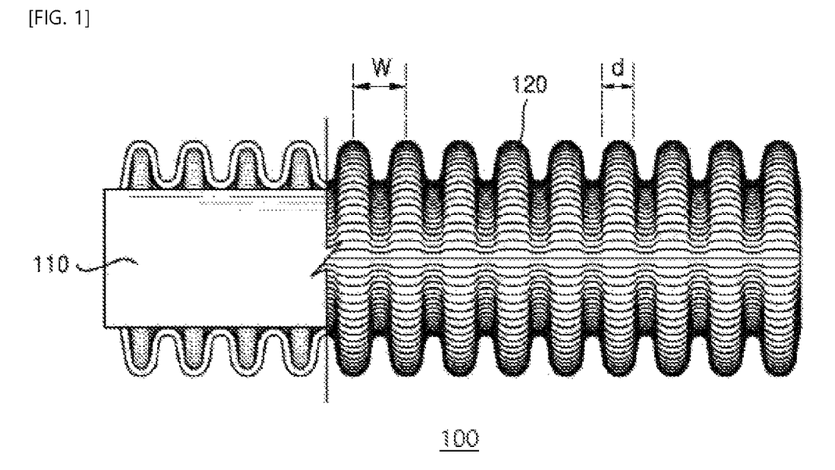
FIG. 1 is a side view showing a fibrous electrode according to an embodiment of the inventive concepts.

As shown in FIG. 1, in the fibrous electrode 100, the carbon nanotube sheet 120 having at least one layer may be coated on the surface of the elastic fiber 110 and the carbon nanotube sheet 120 may have a buckle structure.

The elastic fiber 110 may include a polymer fiber having elasticity. For example, the elastic fiber 110 may include one selected from a group consisting of a polyurethane-based fiber, a polyolefin-based fiber, a polyester-based fiber, a polyamide-based fiber, a natural rubber-based fiber, a synthetic rubber-based fiber, a composite rubber-based fiber of natural rubber and synthetic rubber, and a combination thereof. In particular, the elastic fiber 110 may include one selected from a group consisting of polyurethane, nylon, silicon rubber, and a combination thereof, which are inexpensive and have excellent elasticity and durability. In more particular, the elastic fiber 110 may include silicon rubber which is most strongly adhered to the carbon nanotube sheet 120 by the van der Waals force.

The elastic fiber 110 may be a single fiber or a multi-fiber including one or more fibers.

A diameter of the elastic fiber 110 may range from 1 μm to 1000 μm. If the diameter of the elastic fiber 110 is less than 1 μm, it may be difficult to form the elastic fiber 110. If the diameter of the elastic fiber 110 is greater than 1000 μm, a thickness of the fibrous electrode 100 may be increased. Thus, there may be limitations in using the elastic fiber 100 having the diameter less than 1 μm or greater than 1000 μm in various electronic devices.

The carbon nanotube sheet 120 may be wound in parallel to an axial direction (or the longitudinal direction) of the elastic fiber 110 and thus may be coated on the surface of the elastic fiber 110. For example, the elastic fiber 110 may be used as one axis, and the carbon nanotube sheet 120 may be wound in parallel to the axial direction (or the longitudinal direction) and thus may be coated on the elastic fiber 110.

If the carbon nanotube sheet 120 is wound on the surface of the elastic fiber 110 in a spiral with at least slight inclination, formation of the buckle structure may be difficult and a distance between carbon nanotubes of the carbon nanotube sheet 120 may be increased, and thus movement distances of electrons may be increased to cause an increase in resistance.

To allow the carbon nanotube sheet 120 to have the excellent electrical conductivity, at least one or more carbon nanotubes may be connected to each other like threads in the carbon nanotube sheet 120 and may be uniaxially aligned in a single direction.

The carbon nanotube sheet 120 may be formed by a drawing method from a carbon nanotube layer vertically grown by a chemical vapor deposition (CVD) method.

Thus, the carbon nanotube sheet 120 may be formed to have a desired length from the carbon nanotube layer. As a result, since the fibrous electrode having a length suitable for the application can be formed, the fibrous electrode according to the inventive concepts may be applied to various fields.

In addition, the carbon nanotubes may be continuously bonded to each other in a drawing direction from the carbon nanotube layer, and thus an additional array operation may not be required.

The carbon nanotube may be a single-walled carbon nanotube or a multi-walled carbon nanotube. In particular, the carbon nanotube may be the multi-walled carbon nanotube.

The carbon nanotube sheet 120 may be formed to have a resistance of 0.5 kW/cm to 2 kW/cm, and the resistance of the carbon nanotube sheet 120 may be adjusted by the number of layer(s) of the carbon nanotube sheet 120 wound on the surface of the elastic fiber 110.

Thus, the carbon nanotube sheet 120 may include at least one layer. However, in some embodiments, when the carbon nanotube sheet 120 includes 30 to 60 layers, the electrical connection of the carbon nanotubes may be dense and the carbon nanotube sheet 120 may have a very thin thickness of nanoscale and excellent mechanical strength sufficient for handling. When the number of the layers of the carbon nanotube sheet 120 is less than 30, the carbon nanotube sheet 120 may not endure a process of forming the buckle structure due to its weak mechanical strength, and the resistance of the carbon nanotube sheet 120 may be greater than 2 kW/cm to cause a reduction in electrical conductivity. When the number of the layers of the carbon nanotube sheet 120 is greater than 60, a thickness of the carbon nanotube sheet 120 may be too thick. In addition, adhesive strength between the elastic fiber 110 and the carbon nanotube sheet 120 may be reduced, and thus the carbon nanotube sheet 120 may not be reversibly deformed in continuous deformation of the fibrous electrode 100 and may be separated from the elastic fiber 110.

To form the buckle structure at the carbon nanotube sheet 120, the carbon nanotube sheet 120 may be coated on the surface of the elastic fiber 110 stretched by 100% to 700% in the longitudinal direction, and then, tensile force applied to the elastic fiber 110 may be removed to allow the length of the elastic fiber 110 to be restored to its original length before being stretched. Thus, the carbon nanotube sheet 120 coated on the surface of the elastic fiber 110 may be contracted to form the buckle structure by compressive stress generated by the contraction.

Since the buckle structure of the carbon nanotube sheet 120 is spontaneously or automatically formed as described above, it may be very easy to form the buckle structure. In particular, since the buckle structure of the inventive concepts is formed using the stretching of the elastic fiber 110, not using a mold or high-temperature heat, the buckle structure may be easily formed and a manufacturing time may be reduced. Since the manufacturing time greatly affects a cost of the fibrous electrode, the manufacturing time may be reduced to reduce the cost of the fibrous electrode.

In the present specification, the buckle structure means a pattern structure having an embossed portion and an engraved portion which are induced using a phenomenon that a sheet is suddenly bent in a transverse direction at a limit when pressure is applied in a longitudinal direction of a fiber.

The buckle structure may have a regular or irregular wrinkle structure. However, when the buckle structure is repeatedly deformed in the longitudinal direction, a change in resistance of the regular wrinkle structure may be less than a change in resistance of the irregular wrinkle structure. Thus, in an embodiment, the buckle structure may have the regular wrinkle structure.

When the buckle structure is the regular wrinkle structure, the buckle structure may be a wave-shaped pattern having uniform pattern distances d and uniform pattern widths W. This structure is shown in detail in FIG. 1.

In particular, when the buckle structure is the regular wave-shaped pattern, the pattern distance d of the buckle structure may range from 1 μm to 5 μm, and the pattern width W of the buckle structure may range from 1 μm to 5 μm. If the pattern distance d of the buckle structure is less than 1 μm, the patterns of the buckle structure may be too dense, and thus an internal resistance of the buckle structure may be increased and a change in conductivity may be increased when the fibrous electrode is deformed by external force applied per unit length of the fibrous electrode. If the pattern distance d is greater than 5 μm, elasticity of the fibrous electrode may be insufficient, and thus the effects of the inventive concepts may not be achieved.

If the pattern width W of the buckle structure is less than 1 μm, the elasticity of the fibrous electrode may be insufficient, and thus the effects of the inventive concepts may not be achieved. If the pattern width W is greater than 5 μm, the buckle structure may be easily broken by force applied from the outside and thus may lose conductivity.

Even though the fibrous electrode 100 is variously deformed, e.g., pushed, bent, twisted, folded, or stretched in the longitudinal direction, the constant resistance of the fibrous electrode 100 may be maintained and the fibrous electrode 100 may provide stable performance.

For example, when tensile force is applied to the fibrous electrode 100 in the longitudinal direction (or the axial direction), stress may be applied to the carbon nanotube sheet 120 of the fibrous electrode 100, and thus electrical connection may be broken. However, since the carbon nanotube sheet 120 is coated on the surface of the elastic fiber 110 and is formed to have the buckle structure, the buckle structure may be reversibly stretched or contracted depending on the deformation of the fibrous electrode 100. Thus, the stress may be relaxed to maintain the constant resistance of the fibrous electrode 100 without breakage or loss of electrical connection.

In some embodiments, to improve electric storage characteristics, the fibrous electrode 100 may further include an electrode active material (not shown) on a surface of the carbon nanotube sheet 120. The electrode active material may be an oxide (MeOx) including one metal (Me) selected from a group consisting of Si, Sn, Li, Al, Ag, Bi, In, Ge, Pb, Pt, Ti, Zn, Mg, Mn, Cd, Ce, Cu, Co, Ni, and Fe or may be one conductive polymer selected from a group consisting of poly(3,4-ethylenedioxythiophene), polyaniline, and polypyrrole.

Since the electrode active material fills pores of the carbon nanotube sheet 120 of the fibrous electrode 100, a contact area between the electrode active material and the carbon nanotube sheet 120 may be great and adhesive strength therebetween may be excellent. Thus, electric storage performance of the fibrous electrode 100 may be further improved.

An elastic strain of the fibrous electrode 100 having the structure described above may range from 100% to 500%. If the elastic strain of the fibrous electrode 100 is less than 100%, the flexibility of the fibrous electrode 100 may be insufficient, and thus the effects of the inventive concepts may not be achieved. If the elastic strain of the fibrous electrode 100 is greater than 500%, a residual elongation of the fibrous electrode 100 may be 10% or less to reduce a recovery rate of the fibrous electrode 100, and the carbon nanotube sheet coated on the surface may be tensile-deformed to easily lose conductivity.

As used herein, the term 'elastic strain' may mean a strain at which a residual elongation of a fiber after removing tensile force becomes about 10% or less of an initial length of the fiber before stretching when the fiber is stretched and then is relaxed again.

Another aspect of the inventive concepts relates to a method of manufacturing the fibrous electrode. The method may include:

I) forming a carbon nanotube sheet;

II) stretching an elastic fiber by 100% to 700% in its longitudinal direction and fixing both ends of the elastic fiber;

III) winding the carbon nanotube sheet in such a way that an alignment direction of the carbon nanotube sheet is parallel to the longitudinal direction of the elastic fiber of which the both ends are fixed, thereby forming the elastic fiber coated with the carbon nanotube sheet; and IV) releasing the fixed both ends of the elastic fiber coated with the carbon nanotube sheet to allow the carbon nanotube sheet to have a buckle structure.

The method of manufacturing the fibrous electrode will be described hereinafter in more detail.

First, I) the carbon nanotube sheet is formed. To allow the carbon nanotube sheet to have excellent electrical conductivity, the carbon nanotube sheet may include at least one or more carbon nanotubes which are connected to each other like threads and are uniaxially aligned in a single direction. Thus, the carbon nanotube sheet may be formed by a drawing method from a carbon nanotube layer vertically grown by a CVD method.

In addition, the carbon nanotubes may be continuously bonded to each other in a drawing direction from the carbon nanotube layer, and thus an additional array operation may not be required.

The carbon nanotube may be a single-walled carbon nanotube or a multi-walled carbon nanotube. In particular, the carbon nanotube may be the multi-walled carbon nanotube.

Thereafter, II) the elastic fiber is stretched by 100% to 700% in its longitudinal direction, and the both ends of the elastic fiber are fixed.

The elastic fiber may include a polymer fiber having elasticity. For example, the elastic fiber may include one selected from a group consisting of a polyurethane-based fiber, a polyolefin-based fiber, a polyester-based fiber, a polyamide-based fiber, a natural rubber-based fiber, a synthetic rubber-based fiber, a composite rubber-based fiber of natural rubber and synthetic rubber, and a combination thereof. In particular, the elastic fiber may include one selected from a group consisting of polyurethane, nylon, silicon rubber, and a combination thereof, which are inexpensive and have excellent elasticity and durability. In more particular, the elastic fiber may include silicon rubber which is most strongly adhered to the carbon nanotube sheet by the van der Waals force.

The elastic fiber may be formed by a wet spinning method or an electrospinning method.

The both ends of the obtained elastic fiber may be fixed in a state in which the elastic fiber is stretched by 100% to 700%, and thus the stretched state of the elastic fiber may be maintained.

Next, III) the carbon nanotube sheet is wound in such a way that the alignment direction of the carbon nanotube sheet is parallel to the longitudinal direction of the elastic fiber of which the both ends are fixed, thereby forming the elastic fiber coated with the carbon nanotube sheet. In particular, this process will be described in more detail with reference to FIG. 2.

Figure 2:
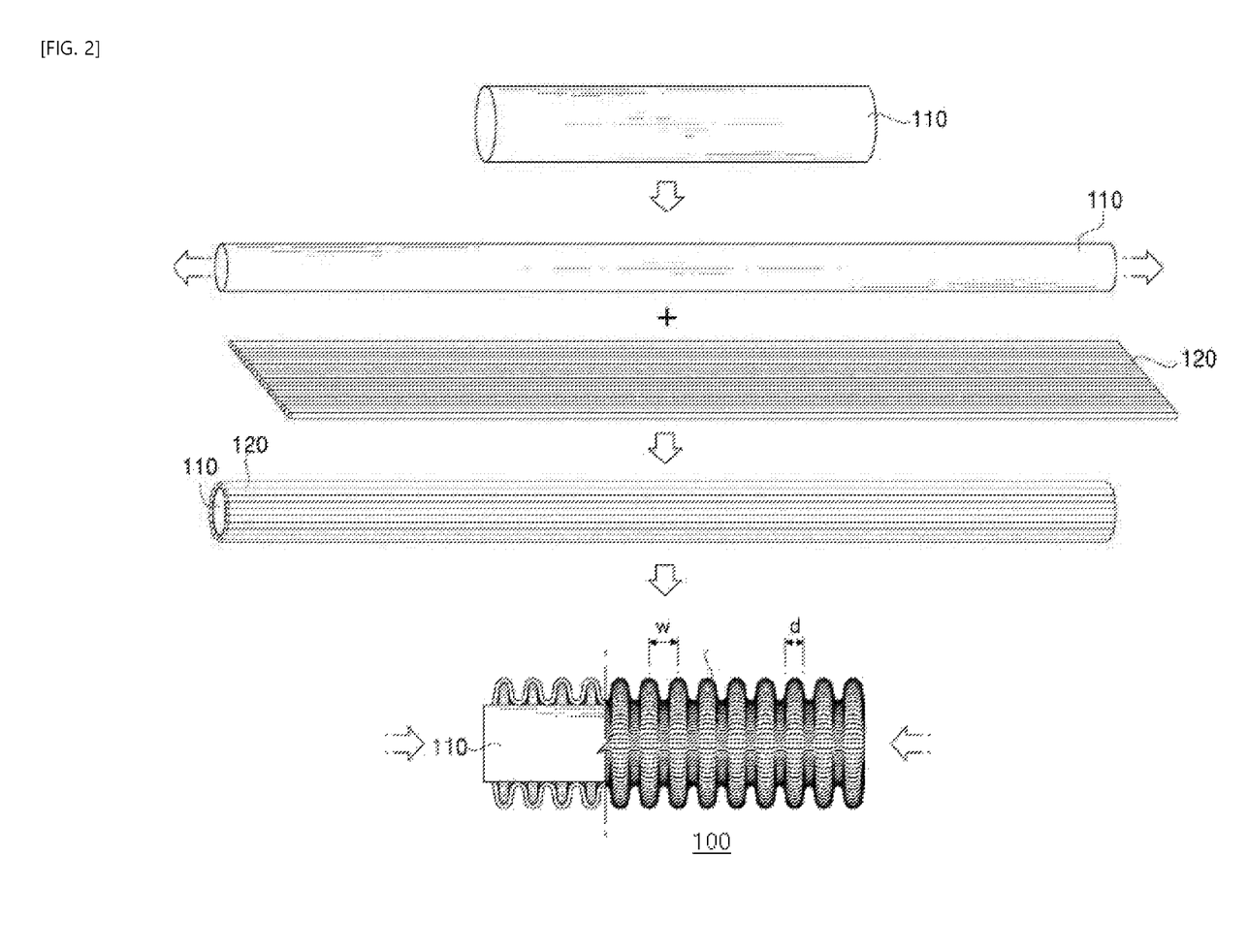
FIG. 2 is a schematic view showing a process of manufacturing a fibrous electrode according to an embodiment of the inventive concepts.

Referring to FIG. 2, the winding of the carbon nanotube sheet 120 on a surface of the elastic fiber 110 in such a way that the alignment direction of the carbon nanotube sheet 120 is parallel to the longitudinal direction of the elastic fiber 110, thereby forming the elastic fiber 110 coated with the carbon nanotube sheet 120 will be described in detail. As shown at a right side of a first arrow in FIG. 2, the stretched elastic fiber 110 having the fixed both ends may be used as an axis, and the carbon nanotube sheet 120 may be wound in parallel to a direction of the axis (i.e., the longitudinal direction of the elastic fiber 110) to wrap the surface of the elastic fiber 110. Thus, as shown at a right side of a second arrow in FIG. 2, the elastic fiber 110 coated with the carbon nanotube sheet 120 may be formed.

In particular, a bias angle of the carbon nanotube sheet 120 arranged with respect to the axial direction of the elastic fiber 110 may be 0 degree.

Here, the bias angle represents a grain direction of the carbon nanotube sheet 120, e.g., an arrangement state of carbon nanotubes in the carbon nanotube sheet 120. In other words, the bias angle means an arranged angle of the carbon nanotubes with respect to the axial direction of the elastic fiber 110.

When the carbon nanotube sheet 120 is coated on the surface of the elastic fiber 110 as described above, distances between the carbon nanotubes of the carbon nanotube sheet 120 may be reduced to significantly improve electrical conductivity.

However, if the carbon nanotube sheet 120 is wound in a spiral with at least slight inclination with respect to the axial direction of the elastic fiber 110, formation of the buckle structure of the carbon nanotube sheet 120 may be difficult, and movement distances of electrons may be increased to cause an increase in resistance.

In addition, in the step III), the number of layers of the carbon nanotube sheet coated on the elastic fiber may be controlled in such a way that a resistance of the elastic fiber coated with the carbon nanotube sheet ranges from 0.5 k$\Omega$/cm to 2 k$\Omega$/cm.

For example, the carbon nanotube sheet may have at least one layer. However, since the resistance of the carbon nanotube sheet is adjusted by the number of the layers of the carbon nanotube sheet, the number of the layers of the carbon nanotube sheet may range from 30 to 60 to have the resistance range described above.

To control the number of the layers of the carbon nanotube sheet, the step III) of winding the carbon nanotube sheet on the elastic fiber may be repeatedly performed until the carbon nanotube sheet is formed to have a desired number of the layers.

When the number of the layers of the carbon nanotube sheet is less than 30, the carbon nanotube sheet may not endure the process of forming the buckle structure due to its weak mechanical strength, and the resistance of the carbon nanotube sheet may be high to cause a reduction in electrical conductivity. When the number of the layers of the carbon nanotube sheet is greater than 60, a thickness of the carbon nanotube sheet may be too thick. In addition, adhesive strength between the elastic fiber and the carbon nanotube sheet may be reduced, and thus the carbon nanotube sheet may not be reversibly deformed in continuous deformation of the fibrous electrode and may be separated from the elastic fiber.

Thereafter, IV) the fixed both ends of the elastic fiber coated with the carbon nanotube sheet may be released to allow the carbon nanotube sheet to have the buckle structure. That is, after the carbon nanotube sheet is wound on the surface of the elastic fiber, external force applied to the stretched elastic fiber may be removed to allow the elastic fiber to be restored to its original shape.

In other words, the carbon nanotube sheet may be coated on the surface of the elastic fiber stretched by 100% to 700% in the longitudinal direction, and then, the tensile force applied to the elastic fiber may be released. In this case, the length of the elastic fiber may be restored to its original length, and thus the carbon nanotube sheet coated on the surface of the elastic fiber may be contracted to form the buckle structure by compressive stress (or contraction stress). As will be described later in embodiments, when the tensile force of the elastic fiber is released, the length of the elastic fiber may be fully restored to its original length before stretching or may not be fully restored to its original length, due to physical force of the carbon nanotube sheet. For example, the length of the elastic fiber may be restored to a length stretched by once to twice the original length before stretching. In addition, after releasing the tensile force of the elastic fiber, a length of the restored elastic fiber (i.e., a length of the elastic fiber having the surface on which the carbon nanotube sheet having the buckle structure is formed; fibrous electrode) is an initial length of the fibrous electrode manufactured by the method according to the embodiments of the inventive concepts.

As described above, the surface of the elastic fiber may be coated with the carbon nanotube sheet, and then, the tensile force may be removed to spontaneously or automatically form the buckle structure. Thus, a manufacturing time of the fibrous electrode may be significantly reduced. In addition, a change in resistance by deformation of the fibrous electrode may be minimized by the buckle structure of the carbon nanotube sheet.

Since the buckle structure of the carbon nanotube sheet is spontaneously or automatically formed as described above, it may be very easy to form the buckle structure. In particular, since the buckle structure of the inventive concepts is formed using the stretching of the elastic fiber 110, not using a mold or high-temperature heat, the buckle structure may be easily formed and the manufacturing time may be reduced. Since the manufacturing time greatly affects a cost of the fibrous electrode, the manufacturing time may be reduced to reduce the cost of the fibrous electrode.

Here, the buckle structure of the inventive concepts means a pattern structure having an embossed portion and an engraved portion which are induced using a phenomenon that a sheet is suddenly bent in a transverse direction at a limit when pressure is applied in a longitudinal direction of a fiber.

The buckle structure may have a regular or irregular wrinkle structure. However, when the buckle structure is repeatedly deformed in the longitudinal direction, a change in resistance of the regular wrinkle structure may be less than a change in resistance of the irregular wrinkle structure. Thus, in an embodiment, the buckle structure may have the regular wrinkle structure.

When the buckle structure is the regular wrinkle structure, the buckle structure may be a wave-shaped pattern having uniform pattern distances d and uniform pattern widths W.

In particular, when the buckle structure is the regular wave-shaped pattern, the pattern distance d of the buckle structure may range from 1 μm to 5 μm, and the pattern width W of the buckle structure may range from 1 μm to 5 μm. If the pattern distance d of the buckle structure is less than 1 μm, the patterns of the buckle structure may be too dense, and thus an internal resistance of the buckle structure may be increased and a change in conductivity may be increased when the fibrous electrode is deformed by external force applied per unit length of the fibrous electrode. If the pattern distance d is greater than 5 μm, elasticity of the fibrous electrode may be insufficient, and thus the effects of the inventive concepts may not be achieved.

If the pattern width W of the buckle structure is less than 1 μm, the elasticity of the fibrous electrode may be insufficient, and thus the effects of the inventive concepts may not be achieved. If the pattern width W is greater than 5 μm, the buckle structure may be easily broken by force applied from the outside and thus may lose conductivity.

Even though the fibrous electrode manufactured through the above processes is variously deformed, e.g., pushed, bent, twisted, folded, or stretched in the longitudinal direction, the constant resistance of the fibrous electrode may be maintained and the fibrous electrode may provide stable performance.

For example, when tensile force is applied to the fibrous electrode in the longitudinal direction (or the axial direction), stress may be applied to the carbon nanotube sheet of the fibrous electrode, and thus electrical connection may be broken. However, since the carbon nanotube sheet is coated on the surface of the elastic fiber and is formed to have the buckle structure, the buckle structure may be reversibly stretched or contracted depending on the deformation of the fibrous electrode. Thus, the stress may be relaxed to maintain the constant resistance of the fibrous electrode without breakage or loss of electrical connection.

In addition, the elastic strain of the fibrous electrode manufactured through the above processes may range from 100% to 500%. If the elastic strain of the fibrous electrode is less than 100%, the flexibility of the fibrous electrode may be insufficient, and thus the effects of the inventive concepts may not be achieved. If the elastic strain of the fibrous electrode is greater than 500%, a residual elongation of the fibrous electrode may be 10% or less to reduce a recovery rate of the fibrous electrode, and the carbon nanotube sheet coated on the surface may be tensile-deformed to easily lose conductivity.

As used herein, the term 'elastic strain' may mean a strain at which a residual elongation of a fiber after removing tensile force becomes about 10% or less of an initial length of the fiber before stretching when the fiber is stretched and then is relaxed again.

In an embodiment, the manufacturing method may further include applying physical compression to the elastic fiber coated with the carbon nanotube sheet to increase adhesive strength between the carbon nanotube sheet and the elastic fiber, after the step III).

The physical compression may be performed by applying pressure to the surface of the elastic fiber coated with the carbon nanotube sheet by a suitable compressing means. At this time, the physical compression may be performed at a pressure lower than a pressure capable of molding the shape of the elastic fiber.

When the pressure is applied to the surface of the elastic fiber coated with the carbon nanotube sheet, the carbon nanotube sheet and the elastic fiber may become closer to each other and at the same time, the Van der Walls force may be increased. Thus, the carbon nanotube sheet may be more strongly adhered/fixed to the elastic fiber to improve elasticity in which the carbon nanotube sheet is changeable by deformation of the elastic fiber.

The compressing means may be, but not limited to, a general compressing means. As will be described in the below embodiments, the suitable compressing means in the inventive concepts may apply compressive force by a simple process of physically rubbing the carbon nanotube sheet. Thus, the adhesive strength between the carbon nanotube sheet and the elastic fiber may be increased without damaging or affecting the alignment direction of the carbon nanotube sheet.

In addition, the method of manufacturing the fibrous electrode may further include electrochemically depositing an electrode active material on a surface of the fibrous electrode. The electrode active material may be an oxide (MeOx) including one metal (Me) selected from a group consisting of Si, Sn, Li, Al, Ag, Bi, In, Ge, Pb, Pt, Ti, Zn, Mg, Mn, Cd, Ce, Cu, Co, Ni, and Fe or may be one conductive polymer selected from a group consisting of poly(3,4-ethylenedioxythiophene), polyaniline, and polypyrrole. In particular, the electrode active material may be appropriately selected depending on a positive electrode or a negative electrode. In some embodiments, the electrode active material may use manganese dioxide or poly(3,4-ethylenedioxythiophene) for the most excellent charge storage performance.

Since the electrode active material is in contact with the buckle structure of the carbon nanotube sheet so as to be coated, a contact area between the electrode active material and the carbon nanotube sheet may be great and adhesive strength therebetween may be excellent. Thus, the electric storage performance of the fibrous electrode may be further improved.

The electrode active material may be formed using an electrochemical deposition method. A voltage of 1V to 1.5V (silver/silver chloride reference electrode) may be applied in the electrochemical deposition method. If the voltage is less than 1V, electrode active material particles may not be sufficiently synthesized. If the voltage is greater than 1.5V, the electrode active material may not be uniformly formed on the surface of the fibrous electrode, a deposition amount may not increase even though the applied voltage increases, and a deposited electrode active material may be separated from the fibrous electrode. In some embodiments, when the electrode active material is electrochemically deposited, a deposition time may be selected from a range of 10 seconds to 60 seconds to adjust a thin film thickness of the electrode active material. If the deposition time is less than 10 seconds, it may be difficult to visually check the formation of the electrode active material. If the deposition time is greater than 60 seconds, adhesive strength between the synthesized electrode active material and the fibrous electrode may be reduced, and thus the electrode active material may be separated from the fibrous electrode.

Still another aspect of the inventive concepts relates to a supercapacitor 200 which includes at least two fibrous electrodes 210 and 220. A structure of the supercapacitor 200 is shown in FIG. 3.

Figure 3:
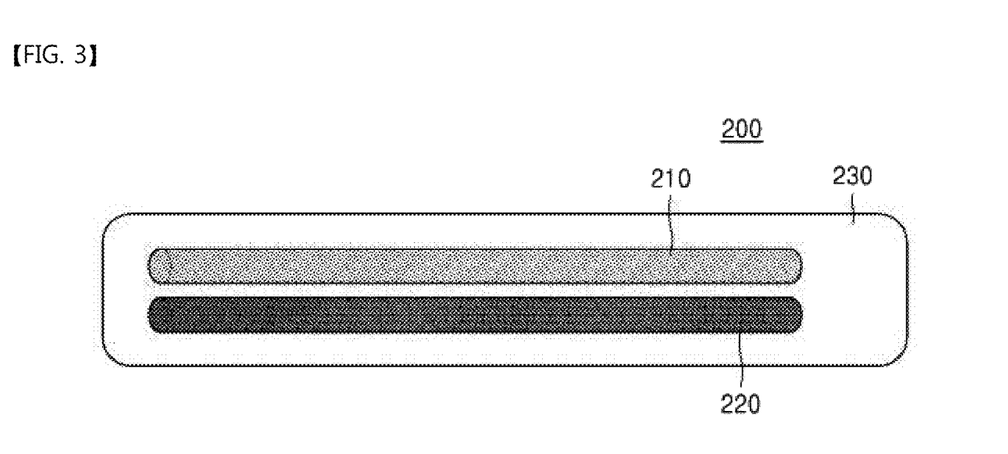
FIG. 3 is a side view showing a supercapacitor according to an embodiment of the inventive concepts.

Referring to FIG. 3, the supercapacitor 200 may include two or more fibrous electrodes 210 and 220 described above. In this case, the two or more fibrous electrodes 210 and 220 may behave like one strand, and a structure thereof may be very stable.

In detail, the supercapacitor 200 of FIG. 3 may use two fibrous electrodes 210 and 220 as a first electrode 210 and a second electrode 220, respectively. In the supercapacitor 200, the first electrode 210 and the second electrode 220 may be disposed adjacent to each other under a condition that an electrical short does not occur between the first and second electrodes 210 and 220.

The first electrode 210 and the second electrode 220 may have a constant separation distance therebetween and may be parallel to each other. The separation distance may range from 0.01 μm to 100 μm. If the separation distance is less than 0.01 μm, an electrical short may occur. If the separation distance is greater than 100 μm, performance of the supercapacitor may be reduced or deteriorated.

In another example of the supercapacitor 200, the first electrode and the second electrode may be twisted together in a 2-ply structure. Here, the supercapacitor 200 may further include a separator disposed between the two fibrous electrodes 210 and 220 or on surfaces of the two fibrous electrodes 210 and 220 to prevent an internal short caused by contact between the two fibrous electrodes 210 and 220.

The supercapacitor 200 may include one electrolyte 230 selected from a group consisting of a liquid electrolyte, a gel-type polymer electrolyte, and a solid electrolyte. The electrolyte 230 may be, but not limited to, an electrolyte generally used in a supercapacitor. In some embodiments, the electrolyte 230 may include neutral polyvinylalcohol-lithium chloride (PVA-LiCl) or basic polyvinylalcohol-potassium hydroxide (PVA-KOH), which has an excellent capacitance.

Even though the supercapacitor 200 is variously deformed, e.g., bent, twisted, or stretched, an increase in resistance of the supercapacitor 200 may not be great. Thus, initial performance of the supercapacitor 200 may be maintained, and the supercapacitor 200 may be restored to an initial state without a loss.

Embodiments of the Inventive Concepts

The inventive concepts will be described more fully hereinafter with reference to the following embodiments. It should be noted, however, that the inventive concepts are not limited to the following embodiments. In addition, on the basis of the following embodiments, it will be apparent to those skilled in the art that various changes and modifications not suggesting experimental results may be made without departing from the spirits and scopes of the inventive concepts.

[Embodiment 1] Fibrous Electrode

First, a catalyst layer of 1 nm to 3 nm was coated on a silicon wafer by an electron-beam deposition process. This was inserted into a quartz tube furnace preheated at 700 degrees Celsius under a gas atmosphere in which argon of 750 sccm and hydrogen of 100 sccm were mixed with each other, and then, was maintained at the same temperature for 5 minutes. Subsequently, acetylene of 50 sccm was injected into the quartz tube furnace to form multi-walled carbon nanotube forest having a length of 400 μm or less and an outer diameter of 12 nm or less and consisting of 9 layers.

A multi-walled carbon nanotube sheet was drawn from a sidewall of the formed multi-walled carbon nanotube forest.

Next, a previously formed silicon rubber fiber having an average diameter of 300 μm was stretched by 700% in its longitudinal direction, and then, both ends of the stretched silicon rubber fiber were fixed.

To wind the carbon nanotube sheet in such a way that an alignment direction of the carbon nanotube sheet is parallel to the longitudinal direction of the silicon rubber fiber, the carbon nanotube sheet was wound by rotating only the silicon rubber fiber in a state in which the carbon nanotube sheet was fixed at an average bias angle of 0 degree on a surface of the fixed silicon rubber fiber.

Thereafter, tensile force applied to the silicon rubber fiber was removed or released to allow the silicon rubber fiber to be restored to an original shape, and thus the carbon nanotube sheet was formed to have a wave-shaped buckle structure having a pattern distance d of 2 μm and a pattern width W of 2 μm. A fibrous electrode having excellent elasticity and high conductivity was manufactured through the processes described above.

[Embodiment 2] Fibrous Electrode Including Electrode Active Material

To deposit manganese dioxide on a surface of the fibrous electrode manufactured in the embodiment 1, the fibrous electrode was cleaned with distilled water and then was dried. Thereafter, to perform an electrochemical deposition method, a three-electrode system was prepared. In the three-electrode system, a silver/silver chloride electrode was used as a reference electrode, a platinum electrode was used as a counter electrode, and the cleaned fibrous electrode was used as a work electrode.

An electrolyte solution and each of the electrodes were inserted into a reactor, and a voltage of 1.2V was applied with respect to the reference electrode for 15 seconds to manufacture an elastic fibrous electrode on which manganese dioxide was deposited.

0.02 M MnSO$_4$.5H$_2$O and 0.2 M Na$_2$SO$_4$ were used as the electrolyte solution.

[Embodiment 3] Supercapacitor Using Fibrous Electrode

First, fibrous electrodes including electrode active materials used as first and second electrodes were manufactured to manufacture a supercapacitor using the fibrous electrode including the electrode active material according to the inventive concepts.

The first electrode of the fibrous electrodes including the electrode active materials was manufactured by the same conditions as the embodiment 2, and the second electrode thereof was manufactured using poly(3,4-ethylenedioxythiophene) as the electrode active material. Other conditions of the second electrode were the same as corresponding conditions of the embodiment 2.

The first and second electrodes were disposed in parallel to each other to have a constant separation distance of 0.5 mm and were coated with a solid electrolyte based on PVA-LiCl, and thus a supercapacitor was manufactured. Since the first and second electrodes were spaced apart from each other by the separation distance and were coated with the solid electrolyte, a short by electrical contact was prevented.

Figure 4:
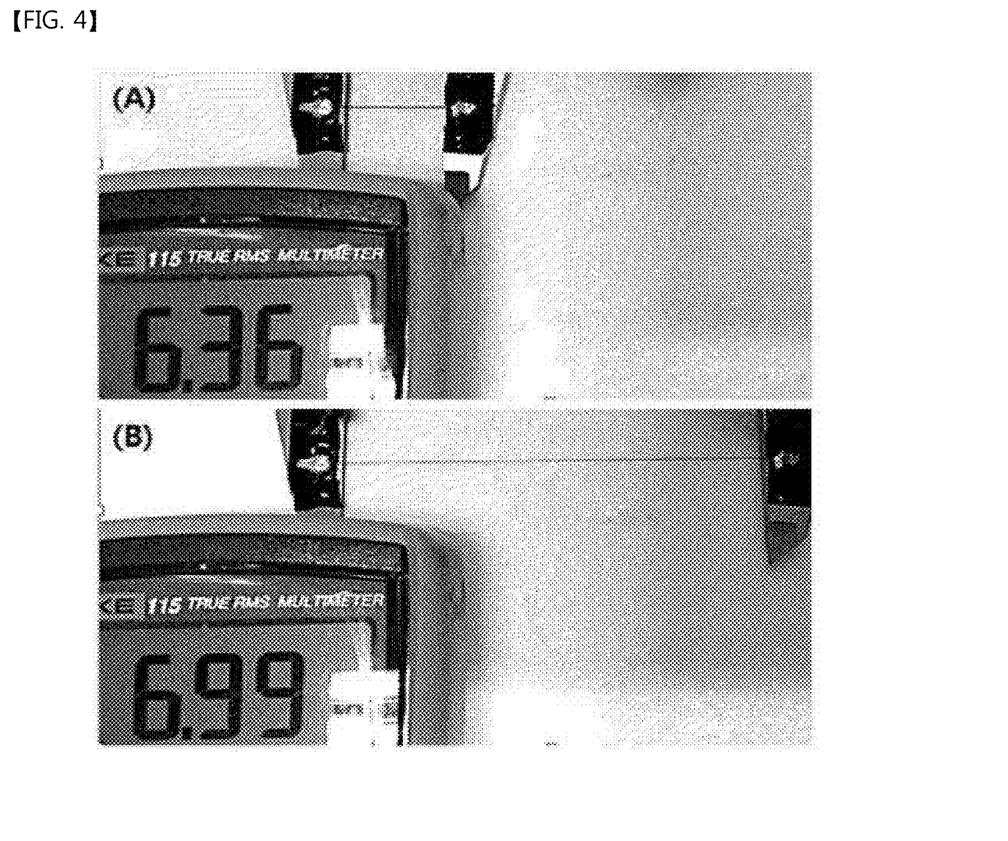
FIG. 4 shows an image (a) of electrical conductivity measured before a fibrous electrode manufactured in an embodiment 1 is stretched, and an image (b) of electrical conductivity measured after the fibrous electrode of the embodiment 1 is stretched by 300% in a longitudinal direction.

FIG. 4 shows an image (a) of electrical conductivity measured before a fibrous electrode manufactured in an embodiment 1 is stretched, and an image (b) of electrical conductivity measured after the fibrous electrode of the embodiment 1 is stretched by 300% in its longitudinal direction. Referring to FIG. 4, the fibrous electrode of the embodiment 1 has a resistance of 2.9 KΩ/cm before being stretched and has a resistance increased by about 10% after being stretched by 300%.

Figure 5:
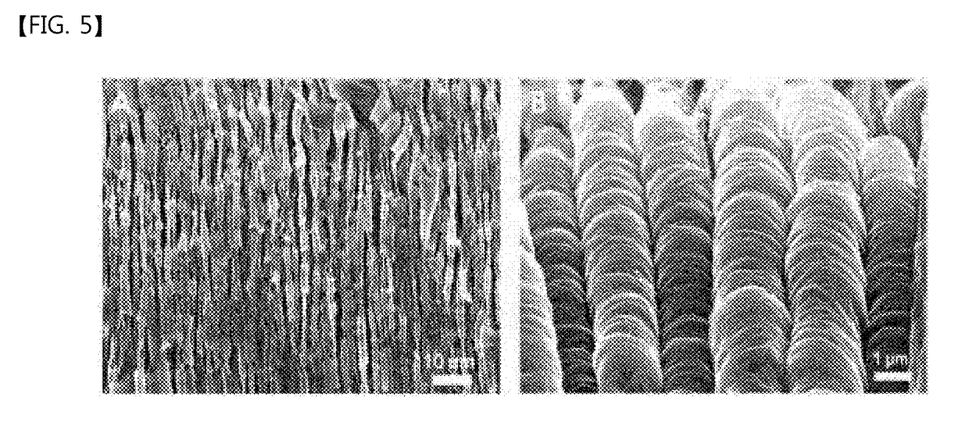
FIG. 5 shows scanning electron microscope (SEM) images of a surface of the fibrous electrode manufactured in the embodiment 1 to check a surface state of a fibrous electrode according to the inventive concepts.

FIG. 5 shows scanning electron microscope (SEM) images of a surface of the fibrous electrode manufactured in the embodiment 1 to check a surface state of a fibrous electrode according to the inventive concepts. Here, an image A of FIG. 5 is a low-magnification image, and an image B of FIG. 5 is a high-magnification image.

As shown in FIG. 5, a uniform buckle structure is formed at the carbon nanotube sheet formed at the surface of the fibrous electrode manufactured in the embodiment 1.

In addition, a pattern period of the buckle structure is 2 μm, and a pattern depth of the buckle structure is 2 μm.

Figure 6:
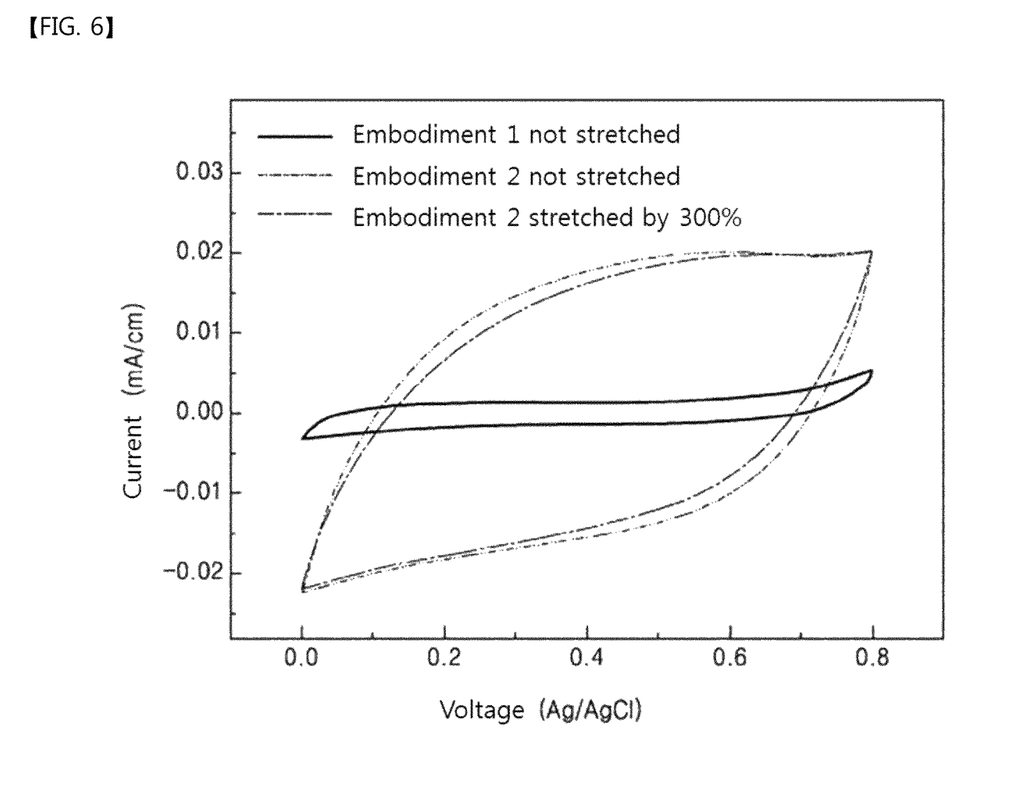
FIG. 6 is a graph showing cyclic voltammetry curves of fibrous electrodes which are manufactured in embodiments 1 and 2 and are not stretched and a fibrous electrode of the embodiment 2 which is stretched by 300%.

FIG. 6 is a graph showing cyclic voltammetry curves of fibrous electrodes which are manufactured in embodiments 1 and 2 and are not stretched and a fibrous electrode of the embodiment 2 which is stretched by 300%. Here, the reference electrode was formed of silver/silver chloride, the electrolyte was Na$_2$SO$_4$ aqueous solution, and a scan rate was 100 mV/sec.

As shown in FIG. 6, the fibrous electrode of the embodiment 1 which is not stretched has excellent elasticity but has weak performance. However, when the fibrous electrode of the embodiment 1 is coated with manganese dioxide (i.e., the fibrous electrode of the embodiment 2), energy storage performance is improved by 950%.

In addition, when the fibrous electrode of the embodiment 2 is stretched by 300%, energy storage performance is maintained at about 90% or more without an increase in resistance. In other words, an elastic strain of the fibrous electrode is 300%, and the fibrous electrode may have high elasticity and may maintain excellent conductivity. A storage capacity of the fibrous electrode of the embodiment 2 was 0.45 mF/cm.

The fibrous electrode according to the embodiments of the inventive concepts may have the high elasticity and thus may be capable of being variously deformed (e.g., bent or stretched) and of being realized in the form of textile. As a result, the fibrous electrode according to the embodiments of the inventive concepts may be effectively applied to flexible electronic devices such as implantable medical devices, microelectronic devices, Google glasses, smart watches, wearable computers, and smart clothing.

According to the embodiments of the inventive concepts, the carbon nanotube sheet may be coated on the surface of the elastic fiber, and then, may be formed to have the buckle structure. The fibrous electrode may include the carbon nanotube sheet having the buckle structure. Thus, the fibrous electrode may maintain a fiber shape, may be light and small and may maintain excellent conductivity even when variously deformed.

In addition, the fibrous electrode according to the embodiments of the inventive concepts may have the high elasticity and thus may be capable of being variously deformed (e.g., bent or stretched) and of being realized in the form of textile. As a result, the fibrous electrode according to the embodiments of the inventive concepts may be effectively applied to flexible electronic devices such as implantable medical devices, microelectronic devices, Google glasses, smart watches, wearable computers, and smart clothing.

Furthermore, a supercapacitor using the fibrous electrode includes flexible materials and thus is not easily damaged by external force such as tension or pressure. As a result, the supercapacitor may be applied to various fields because of its excellent flexibility.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A supercapacitor comprising:
    a first electrode;
    a second electrode; and
    a solid electrolyte coated on the first electrode and the second electrode,
    wherein each of the first electrode and the second electrode comprises:
        an elastic fiber,
        a carbon nanotube sheet that is coated on a surface of the elastic fiber, and
        an electrode active material provided on a surface of the carbon nanotube sheet,
    wherein each of the carbon nanotube sheets of the first electrode and the second electrode has a buckle structure,
    wherein the electrode active material of the first electrode comprises manganese dioxide,
    wherein the electrode active material of the second electrode comprises poly(3,4-ethylenedioxythiophene), and
    wherein the solid electrolyte comprises PVA-LiCl.

2. The supercapacitor of claim 1, wherein each of the carbon nanotube sheets is wound in such a way that an alignment direction of each of the carbon nanotube sheets is parallel to a longitudinal direction of each of the elastic fibers, so as to be coated on the surface of each of the elastic fibers.

3. The supercapacitor of claim 1, wherein the buckle structure has a wave shape having a pattern distance of 1 μm to 5 μm and a pattern width of 1 μm to 5 μm.

4. The supercapacitor of claim 1, wherein an elastic strain of each of the fibrous electrode and the second electrode ranges from 100% to 500%.

5. A method of manufacturing a fibrous electrode, the method comprising:
　forming a carbon nanotube sheet;
　stretching an elastic fiber by 100% to 700% in its longitudinal direction and fixing both ends of the elastic fiber;
　winding the carbon nanotube sheet in such a way that an alignment direction of the carbon nanotube sheet is parallel to the longitudinal direction of the elastic fiber of which the both ends are fixed, thereby forming the elastic fiber coated with the carbon nanotube sheet;
　applying physical compression to the elastic fiber coated with the carbon nanotube sheet by a process of physically rubbing the carbon nanotube sheet after the winding of the carbon nanotube sheet; and
　releasing the fixed both ends of the elastic fiber coated with the carbon nanotube sheet to allow the carbon nanotube sheet to have a buckle structure.

6. The method of claim 5, wherein the winding of the carbon nanotube sheet comprises: controlling the number of layers of the carbon nanotube sheet coated on the elastic fiber in such a way that a resistance of the elastic fiber coated with the carbon nanotube sheet ranges from 0.5 kΩ/cm to 2 kΩ/cm.

7. The method of claim 5, wherein the buckle structure has a wave shape having a pattern distance of 1 μm to 5 μm and a pattern width of 1 μm to 5 μm.

8. The method of claim 5, further comprising:
　electrochemically depositing an electrode active material on a surface of the fibrous electrode.

* * * * *